US011950257B2

(12) United States Patent
Khoshnevisan et al.

(10) Patent No.: US 11,950,257 B2
(45) Date of Patent: Apr. 2, 2024

(54) PHYSICAL DOWNLINK CONTROL CHANNEL AND SYNCHRONIZATION SIGNAL BLOCK COLLISION

(71) Applicant: QUALCOMM Incorporated, San Diego, CA (US)

(72) Inventors: Mostafa Khoshnevisan, San Diego, CA (US); Tao Luo, San Diego, CA (US); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/312,464

(22) Filed: May 4, 2023

(65) Prior Publication Data

US 2023/0389033 A1  Nov. 30, 2023

Related U.S. Application Data

(63) Continuation of application No. 17/303,577, filed on Jun. 2, 2021, now Pat. No. 11,690,073.

(60) Provisional application No. 63/046,992, filed on Jul. 1, 2020.

(51) Int. Cl.
*H04W 72/23* (2023.01)
*H04W 56/00* (2009.01)

(52) U.S. Cl.
CPC ......... *H04W 72/23* (2023.01); *H04W 56/001* (2013.01)

(58) Field of Classification Search
CPC .. H04W 72/23; H04W 56/001; H04L 5/0094; H04L 5/0053; H04L 5/005
See application file for complete search history.

(56) References Cited

U.S. PATENT DOCUMENTS

| 2020/0374036 A1 | 11/2020 | Seo et al. |
| 2020/0413356 A1* | 12/2020 | Wang ................. H04W 72/046 |
| 2022/0007342 A1 | 1/2022 | Khoshnevisan et al. |

(Continued)

FOREIGN PATENT DOCUMENTS

WO  WO-2019031787 A1  2/2019

OTHER PUBLICATIONS

CMCC: "Discussion on PDCCH Repetition for URLLC," 3GPP Draft, 3GPP TSG RAN WG1 Meeting 93, R1-1806362, 3rd Generation Partnership Project (3GPP), Mobile Competence Centre, 650, Route Des Lucioles, F-06921, Sophia-Antipolis Cedex, France, vol. RAN WG1. No. Busan, Korea, May 21, 2018-May 25, 2018, May 12, 2018 (May 12, 2018), XP051462505, 4 pages, section 2.

(Continued)

*Primary Examiner* — Kyaw Z Soe
(74) *Attorney, Agent, or Firm* — Harrity & Harrity, LLP

(57) ABSTRACT

Various aspects of the present disclosure generally relate to wireless communication. In some aspects, a mobile station may receive, from a base station, information indicating resource locations in which one or more synchronization signal blocks (SSBs), of a set of SSBs, are to be transmitted. The mobile station may selectively monitor a plurality of sets of resource element groups (REGs) of physical downlink control channel (PDCCH) repetitions based at least in part on whether at least one SSB, of the one or more SSBs, is to collide with one or more of the plurality of sets of REGs. Numerous other aspects are described.

30 Claims, 11 Drawing Sheets

(56) References Cited

U.S. PATENT DOCUMENTS

2022/0022065 A1\* 1/2022 Wang .................... H04W 24/08

OTHER PUBLICATIONS

International Search Report and Written Opinion—PCT/US2021/070655—ISA/EPO—dated Oct. 5, 2021.
Spreadtrum Communications: "Remaining Issues on PDCCH Structure," 3GPP Draft, 3GPP TSG RAN WG1 Meeting #93, R1-1806408_Remaining Issues on PDCCH Structure, 3rd Generation Partnership Project (3GPP), Mobile Competence Centre, 650, Route Des Lucioles, F-06921, Sophia-Antipolis Cedex, France, vol. RAN WG1. No. Busan, Korea, May 21, 2018-May 25, 2018, May 12, 2018 (May 12, 2018), XP051462525, 5 pages, section 2.3 and appendix.

\* cited by examiner

PHYSICAL DOWNLINK CONTROL CHANNEL AND SYNCHRONIZATION SIGNAL BLOCK COLLISION

CROSS-REFERENCE TO RELATED APPLICATION

This Patent Application is a continuation of U.S. Non-Provisional patent application Ser. No. 17/303,577, filed on Jun. 2, 2021, which claims priority to U.S. Provisional Patent Application No. 63/046,992, filed on Jul. 1, 2020, entitled "PHYSICAL DOWNLINK CONTROL CHANNEL AND SYNCHRONIZATION SIGNAL BLOCK COLLISION," and assigned to the assignee hereof. The disclosure of the prior Applications are considered part of and are incorporated by reference into this Patent Application.

FIELD OF THE DISCLOSURE

Aspects of the present disclosure generally relate to wireless communication and to techniques and apparatuses for physical downlink control channel (PDCCH) and synchronization signal block (SSB) collision.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a mobile station for wireless communication includes a memory and one or more processors, coupled to the memory, configured to: receive, from a base station, information indicating resource locations in which one or more synchronization signal blocks (SSBs), of a set of SSBs, are to be transmitted; and selectively monitor a plurality of sets of resource element groups (REGs) of physical downlink control channel (PDCCH) repetitions based at least in part on whether at least one SSB, of the one or more SSBs, is to collide with one or more of the plurality of sets of REGs.

In some aspects, a base station for wireless communication includes a memory and one or more processors, coupled to the memory, configured to: transmit, to a mobile station, information indicating resource locations in which one or more SSBs, of a set of SSBs, are to be transmitted; and selectively transmit in a plurality of sets of REGs of PDCCH repetitions based at least in part on whether at least one SSB, of the one or more SSBs, is to collide with one or more of the plurality of sets of REGs.

In some aspects, a method of wireless communication performed by a mobile station includes receiving, from a base station, information indicating resource locations in which one or more SSBs, of a set of SSBs, are to be transmitted; and selectively monitoring a plurality of sets of REGs of PDCCH repetitions based at least in part on whether at least one SSB, of the one or more SSBs, is to collide with one or more of the plurality of sets of REGs.

In some aspects, a method of wireless communication performed by a base station includes transmitting, to a mobile station, information indicating resource locations in which one or more SSBs, of a set of SSBs, are to be transmitted; and selectively transmitting in a plurality of sets of REGs of PDCCH repetitions based at least in part on whether at least one SSB, of the one or more SSBs, is to collide with one or more of the plurality of sets of REGs.

In some aspects, a non-transitory computer-readable medium storing a set of instructions for wireless communication includes one or more instructions that, when executed by one or more processors of a mobile station, cause the mobile station to: receive, from a base station, information indicating resource locations in which one or more SSBs, of a set of SSBs, are to be transmitted; and selectively monitor a plurality of sets of REGs of PDCCH repetitions based at least in part on whether at least one SSB, of the one or more SSBs, is to collide with one or more of the plurality of sets of REGs.

In some aspects, a non-transitory computer-readable medium storing a set of instructions for wireless communication includes one or more instructions that, when executed by one or more processors of a base station, cause the base station to: transmit, to a mobile station, information indicating resource locations in which one or more SSBs, of a set of SSBs, are to be transmitted; and selectively transmit in a plurality of sets of REGs of PDCCH repetitions based at least in part on whether at least one SSB, of the one or more SSBs, is to collide with one or more of the plurality of sets of REGs.

In some aspects, an apparatus for wireless communication includes means for receiving, from a base station, information indicating resource locations in which one or more SSBs, of a set of SSBs, are to be transmitted; and means for selectively monitoring a plurality of sets of REGs of PDCCH repetitions based at least in part on whether at least one SSB, of the one or more SSBs, is to collide with one or more of the plurality of sets of REGs.

In some aspects, an apparatus for wireless communication includes means for transmitting, to a mobile station, information indicating resource locations in which one or more SSBs, of a set of SSBs, are to be transmitted; and means for selectively transmitting in a plurality of sets of REGs of PDCCH repetitions based at least in part on whether at least one SSB, of the one or more SSBs, is to collide with one or more of the plurality of sets of REGs.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
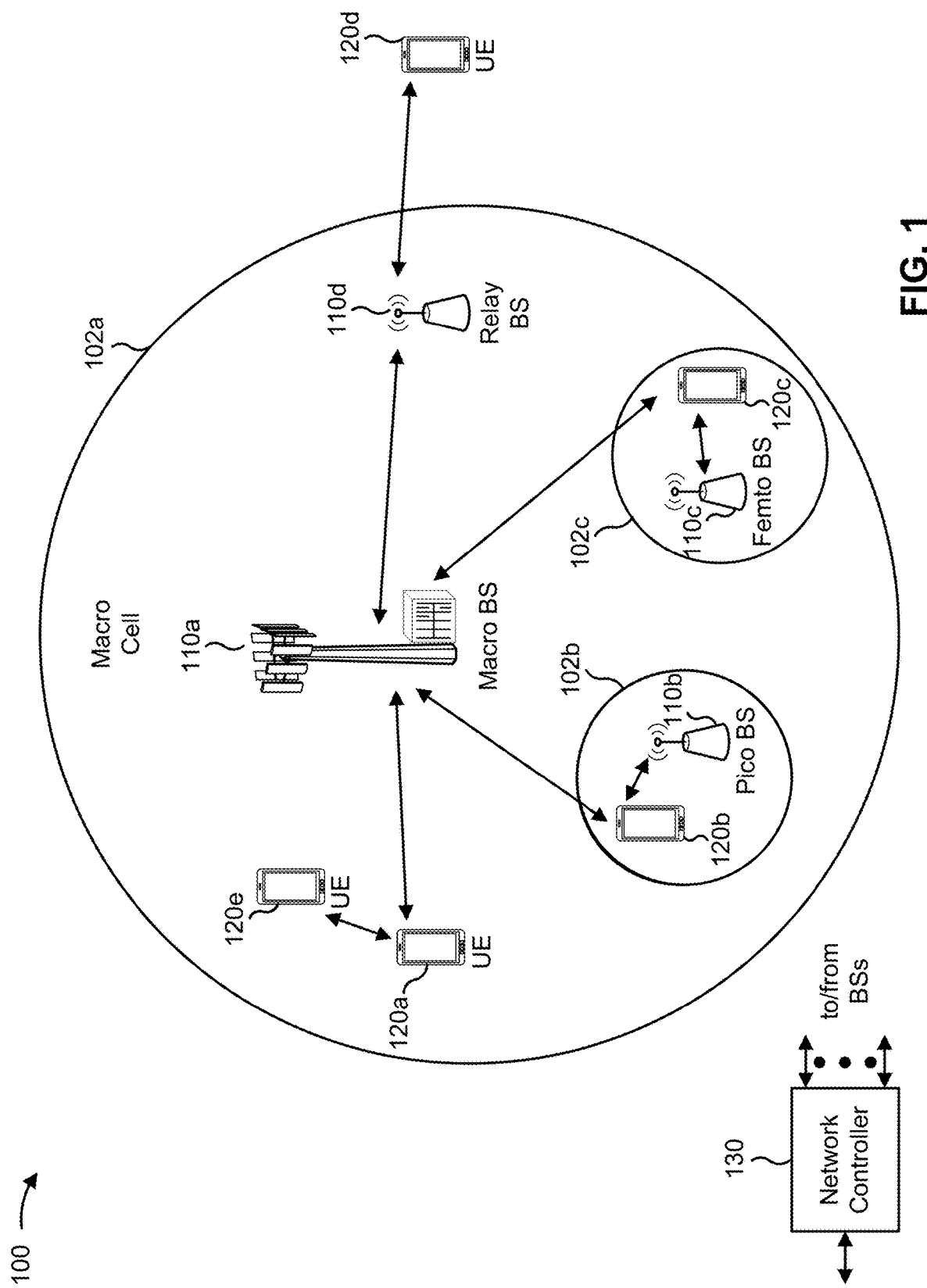
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D)

communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
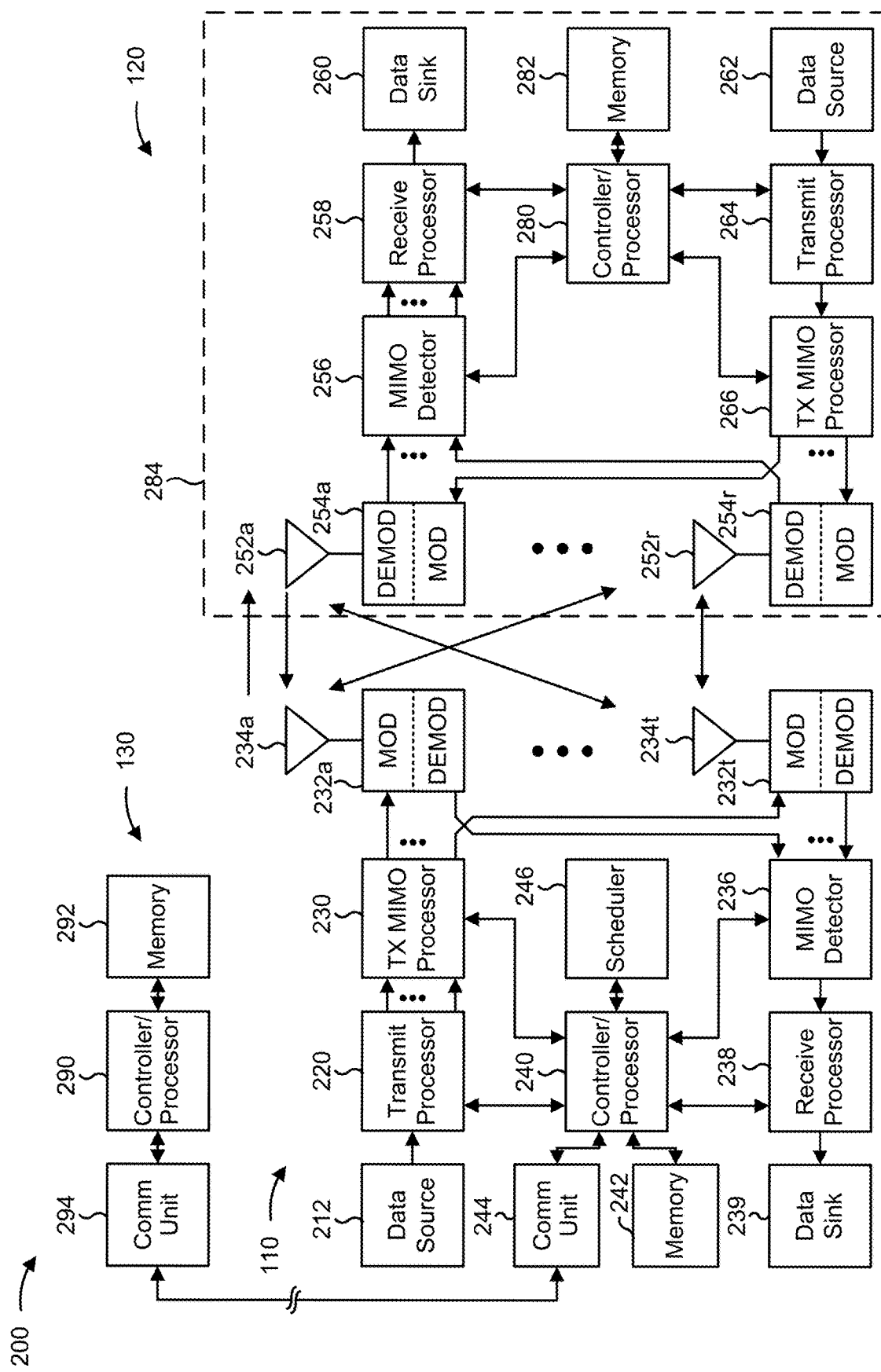
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 7A-7C, 8, and 9).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 7A-7C, 8, and 9).

Controller/processor 240 of base station 110, controller/processor 280 of UE 120, and/or any other component(s) of FIG. 2 may perform one or more techniques associated with PDCCH and synchronization signal block (SSB) collision, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some aspects, executing instructions may include running the instructions, converting the instructions, compiling the instructions, and/or interpreting the instructions, among other examples.

In some aspects, UE 120 may include means for receiving information indicating resource locations in which one or more SSBs, of a set of SSBs, are to be transmitted, means for determining whether at least one SSB, of the one or more SSBs, is to collide with one or more of a plurality of sets of REGs of PDCCH repetitions, means for selectively monitoring the plurality of sets of REGs based at least in part on whether the at least one SSB is to collide with the one or more of the plurality of sets of REGs, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting, to a UE, information indicating resource locations in which one or more SSBs, of a set of SSBs, are to be transmitted, means for determining whether the UE is to monitor a plurality of sets of REGs of PDCCH repetitions, means for selectively transmitting in the plurality of sets of REGs based at least in part on whether at least one SSB, of the one or more SSBs, is to collide with one or more of the plurality of sets of REGs, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
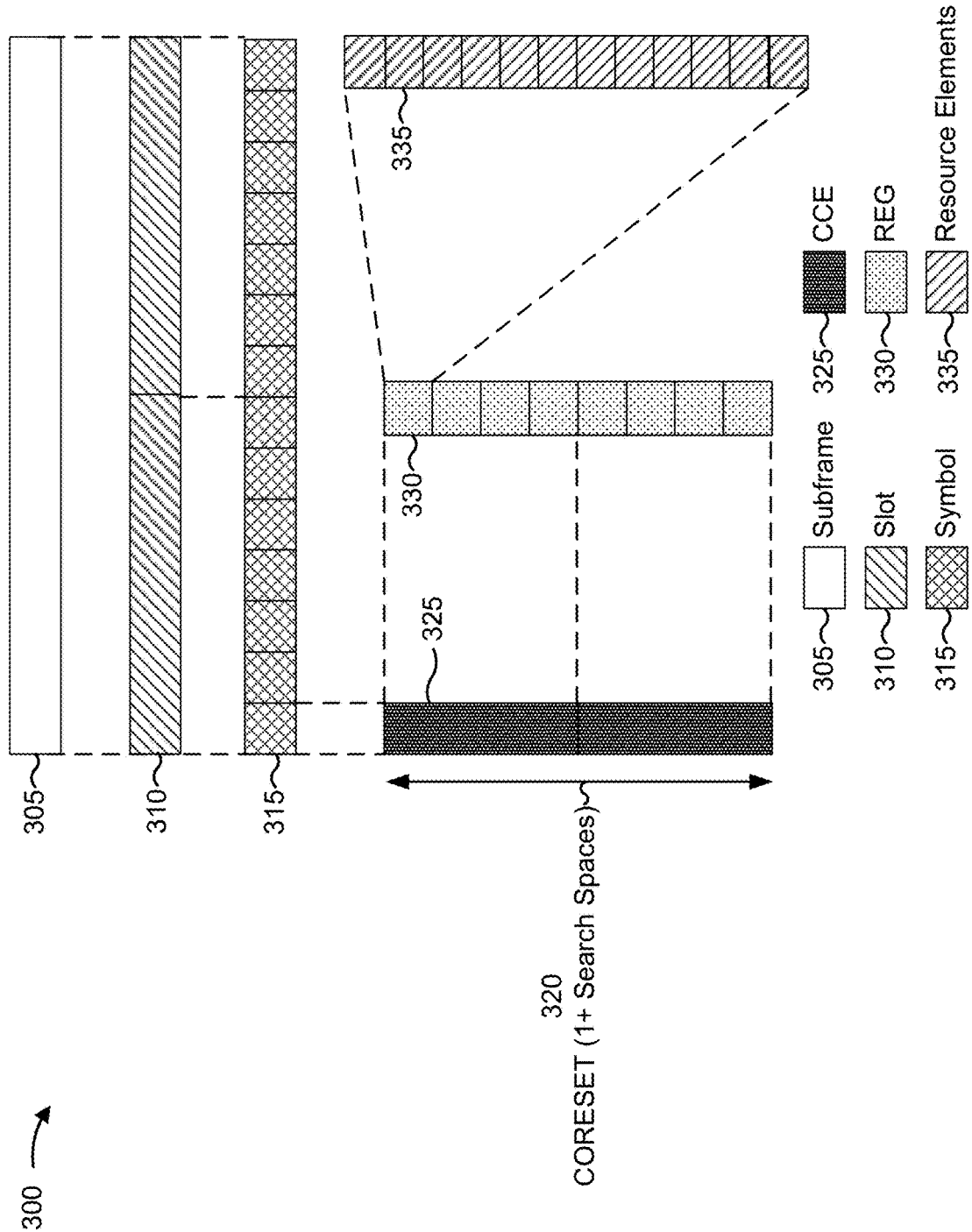
FIG. 3 is a diagram illustrating an example resource structure for wireless communication, in accordance with the present disclosure.

FIG. 3 is a diagram illustrating an example resource structure 300 for wireless communication, in accordance with the present disclosure. Resource structure 300 shows an example of various groups of resources described herein. As shown, resource structure 300 may include a subframe 305. Subframe 305 may include multiple slots 310. While resource structure 300 is shown as including 2 slots per subframe, a different number of slots may be included in a subframe (e.g., 4 slots, 8 slots, 16 slots, 32 slots, and/or the like). In some aspects, different types of transmission time intervals (TTIs) may be used, other than subframes and/or slots. A slot 310 may include multiple symbols 315, such as 7 symbols or 14 symbols per slot.

The potential control region of a slot 310 may be referred to as a control resource set (CORESET) 320 and may be structured to support an efficient use of resources, such as by flexible configuration or reconfiguration of resources of the CORESET 320 for one or more PDCCHs, one or more physical downlink shared channels (PDSCHs), and/or the like. In some aspects, the CORESET 320 may occupy the first symbol 315 of a slot 310, the first two symbols 315 of a slot 310, or the first three symbols 315 of a slot 310. Thus, a CORESET 320 may include multiple resource blocks (RBs) in the frequency domain, and either one, two, or three symbols 315 in the time domain. In 5G, a quantity of resources included in the CORESET 320 may be flexibly configured, such as by using radio resource control (RRC) signaling to indicate a frequency domain region (e.g., a quantity of resource blocks) and/or a time domain region (e.g., a quantity of symbols) for the CORESET 320.

As illustrated, a symbol 315 that includes CORESET 320 may include one or more control channel elements (CCEs) 325, shown as two CCEs 325 as an example, that span a portion of the system bandwidth. A CCE 325 may include downlink control information (DCI) that is used to provide control information for wireless communication. A base station may transmit DCI during multiple CCEs 325 (as shown), where the quantity of CCEs 325 used for transmission of DCI represents the aggregation level used by the BS for the transmission of DCI. In FIG. 3, an aggregation level of two is shown as an example, corresponding to two CCEs 325 in a slot 310. In some aspects, different aggregation levels may be used, such as 1, 4, 8, 16, and/or the like.

Each CCE 325 may include a fixed quantity of resource element groups (REGs) 330, shown as four REGs 330, or may include a variable quantity of REGs 330. In some aspects, the quantity of REGs 330 included in a CCE 325 may be specified by a REG bundle size. A REG 330 may include one resource block, which may include 12 resource elements (REs) 335 within a symbol 315. A resource element 335 may occupy one subcarrier in the frequency domain and one OFDM symbol in the time domain.

A search space may include all possible locations (e.g., in time and/or frequency) where a PDCCH may be located. A CORESET 320 may include one or more search spaces, such as a UE-specific search space, a group-common search space, and/or a common search space. A search space may indicate a set of CCE locations where a UE may find PDCCHs that can potentially be used to transmit control information to the UE. The possible locations for a PDCCH may depend on whether the PDCCH is a UE-specific PDCCH (e.g., for a single UE) or a group-common PDCCH (e.g., for multiple UEs), an aggregation level being used, and/or the like. A possible location (e.g., in time and/or frequency) for a PDCCH may be referred to as a PDCCH candidate, and the set of all possible PDCCH locations may be referred to as a search space. For example, the set of all possible PDCCH locations for a particular UE may be referred to as a UE-specific search space. Similarly, the set of all possible PDCCH locations across all UEs may be referred to as a common search space. The set of all possible PDCCH locations for a particular group of UEs may be referred to as a group-common search space.

A CORESET 320 may be interleaved or non-interleaved. An interleaved CORESET 320 may have CCE-to-REG mapping such that adjacent CCEs are mapped to scattered REG bundles in the frequency domain (e.g., adjacent CCEs are not mapped to consecutive REG bundles of the CORESET 320). A non-interleaved CORESET 320 may have a CCE-to-REG mapping such that all CCEs are mapped to consecutive REG bundles (e.g., in the frequency domain) of the CORESET 320.

As indicated above, FIG. 3 is provided as an example. Other examples may differ from what is described with respect to FIG. 3.

Figure 4:
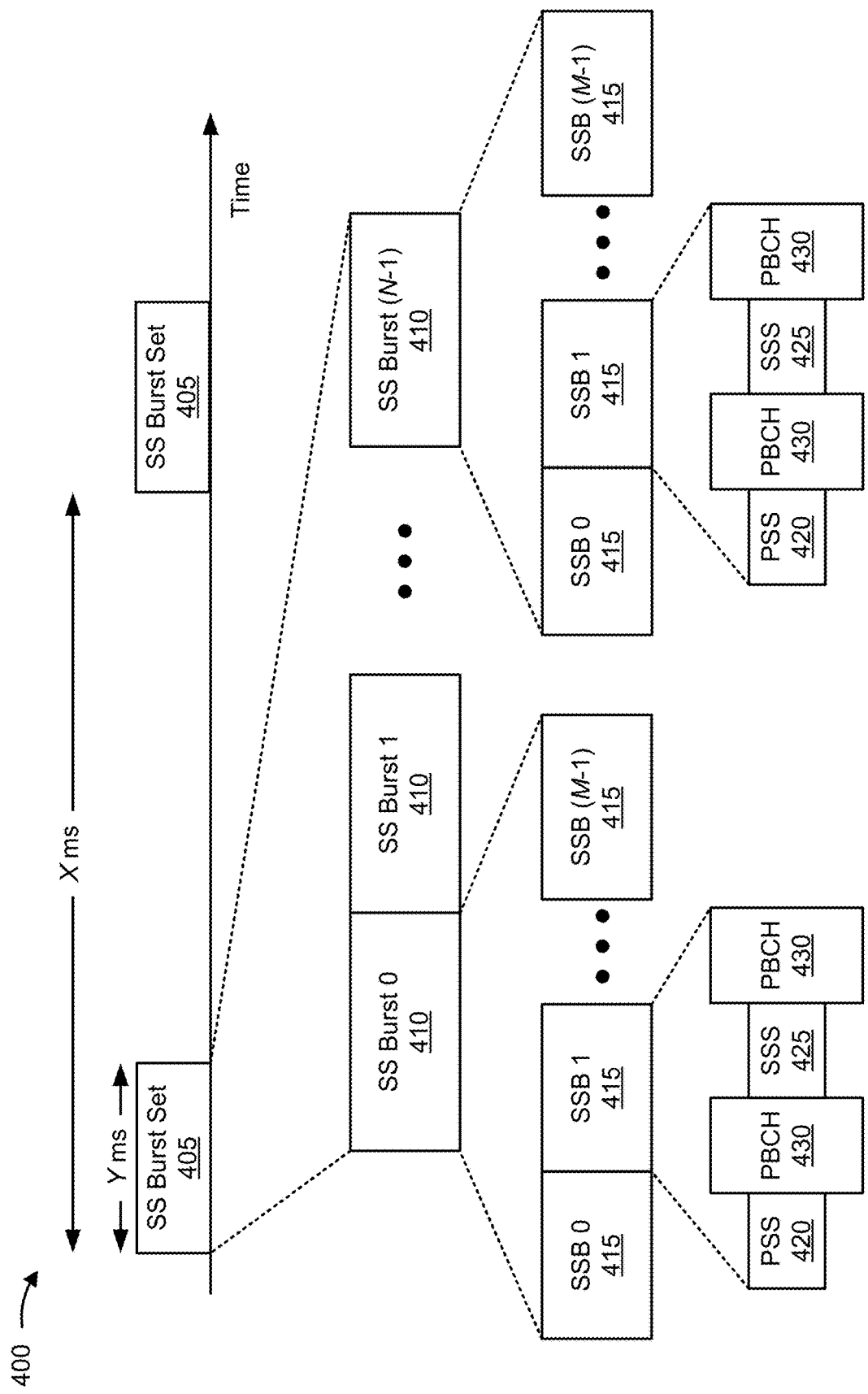
FIG. 4 is a diagram illustrating an example of a synchronization signal hierarchy, in accordance with the present disclosure.

FIG. 4 is a diagram illustrating an example 400 of a synchronization signal (SS) hierarchy, in accordance with the present disclosure. As shown in FIG. 4, the SS hierarchy may include an SS burst set 405, which may include multiple SS bursts 410, shown as SS burst 0 through SS burst N−1, where N is a maximum number of repetitions of the SS burst 410 that may be transmitted by the base station. As further shown, each SS burst 410 may include one or more SSBs 415, shown as SSB 0 through SSB M−1, where M is a maximum number of SSBs 415 that can be carried by an SS burst 410. In some aspects, different SSBs 415 may be beam-formed differently (e.g., transmitted using different beams in a beam sweep), and may be used for beam management, beam selection, and/or the like (e.g., as part of an initial network access procedure). An SS burst set 405 may be periodically transmitted by a wireless node (e.g., base station 110), such as every X milliseconds (ms), as shown in FIG. 4. In some aspects, an SS burst set 405 may have a fixed or dynamic length (e.g., a length of 5 ms, such as a first half or a second half of a frame), shown as Y ms in FIG. 3. In some aspects, a maximum quantity of SSBs 415 in an SS burst set 405 (e.g., a 5 ms burst set) may be four (e.g., in a sub-3 GHz band), eight (e.g., in a sub-8 GHz band), 64 (e.g., in FR2), and/or the like. In some cases, an SS burst set 405 or an SS burst 410 may be referred to as a discovery reference signal (DRS) transmission window, an SSB measurement time configuration (SMTC) window, and/or the like.

In some aspects, an SSB 415 may include resources that carry a PSS 420, an SSS 425, a physical broadcast channel (PBCH)/master information block (MIB) 430, and/or the like. In some aspects, multiple SSBs 415 are included in an SS burst 410 (e.g., with transmission on different beams), and the PSS 420, the SSS 425, and/or the PBCH/MIB 430 may be the same across each SSB 415 of the SS burst 410. In some aspects, a single SSB 415 may be included in an SS burst 410. In some aspects, the SSB 415 may be at least four symbols (e.g., OFDM symbols) in length, where each symbol carries one or more of the PSS 420 (e.g., occupying one symbol), the SSS 425 (e.g., occupying one symbol), and/or the PBCH/MIB 430 (e.g., occupying two symbols). In some aspects, an SSB 415 may be referred to as an SS/PBCH block.

In some aspects, the symbols of an SSB 415 are consecutive, as shown in FIG. 4. In some aspects, the symbols of an SSB 415 are non-consecutive. Similarly, in some aspects, one or more SSBs 415 of the SS burst 410 may be transmitted in consecutive radio resources (e.g., consecutive symbols) during one or more slots. Additionally, or alternatively, one or more SSBs 415 of the SS burst 410 may be transmitted in non-consecutive radio resources.

In some aspects, the SS bursts 410 may have a burst period, and the SSBs 415 of the SS burst 410 may be transmitted by a wireless node (e.g., base station 110) according to the burst period. In this case, the SSBs 415 may be repeated during each SS burst 410. In some aspects, the SS burst set 405 may have a burst set periodicity (e.g., 5 ms, 10 ms, 20 ms (which may be a default periodicity), 160 ms, and/or the like), whereby the SS bursts 410 of the SS burst set 405 are transmitted by the wireless node according to the fixed burst set periodicity. In other words, the SS bursts 410 may be repeated during each SS burst set 405.

In some aspects, an SSB 415 may include an SSB index (e.g., SSB index 0, 1, 2, . . . , 63, such as for 64 SSBs), which may correspond to a beam used to carry the SSB 415. A UE 120 may monitor for and/or measure SSBs 415 using different receive (Rx) beams during an initial network access procedure. Based at least in part on the monitoring and/or measuring, the UE 120 may indicate one or more SSBs 415 with a best signal parameter (e.g., an RSRP parameter and/or the like) to a base station 110. The base station 110 and the UE 120 may use the one or more indicated SSBs 415 to select one or more beams to be used for communication between the base station 110 and the UE 120 (e.g., for a random access channel (RACH) procedure and/or the like). Additionally, or alternatively, the UE 120 may use the SSB 415 and/or the SSB index to determine a cell timing for a cell via which the SSB 415 is received (e.g., a serving cell).

As indicated above, FIG. 4 is provided as an example. Other examples may differ from what is described with regard to FIG. 4.

Figure 5:
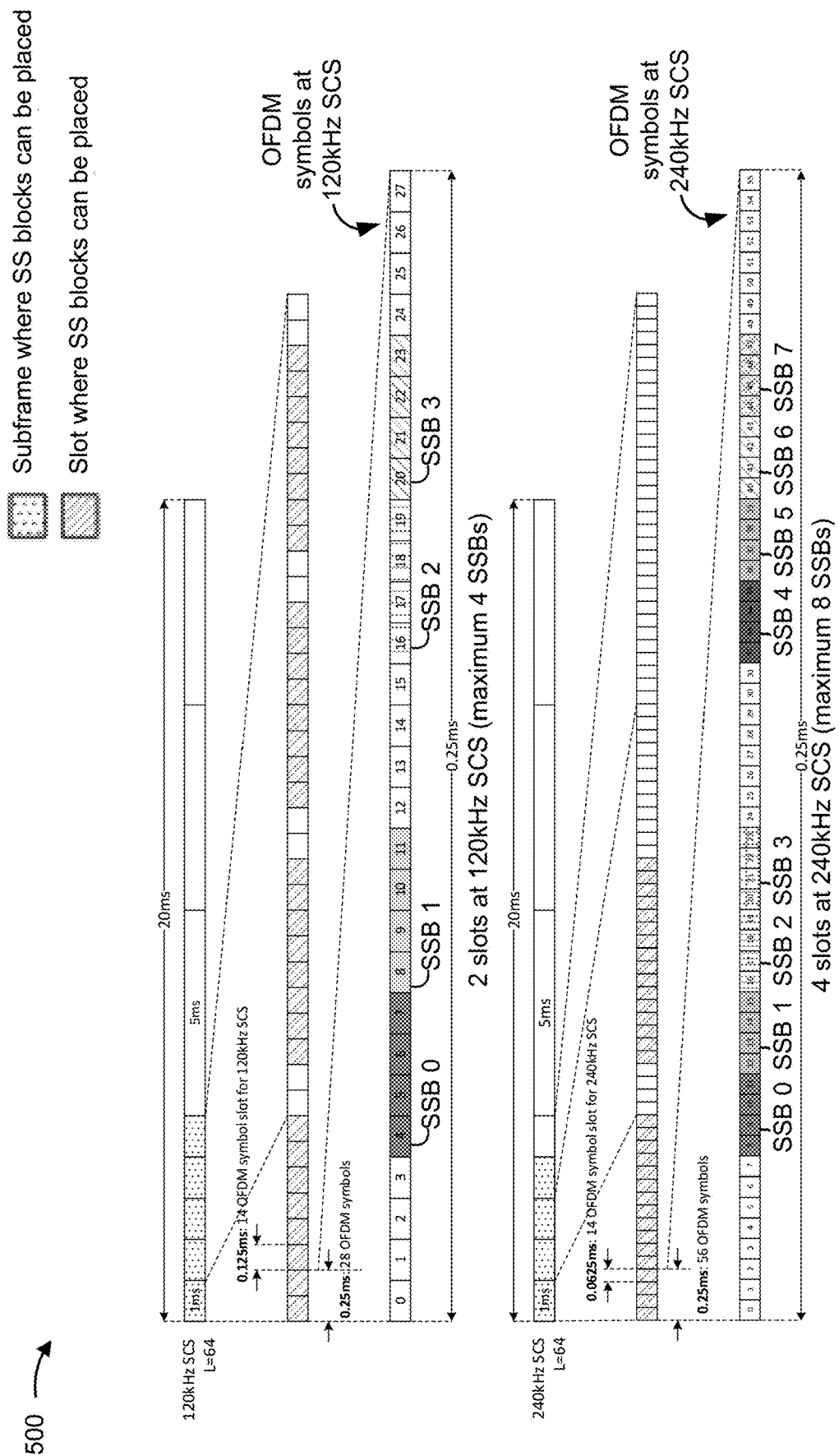
FIG. 5 is a diagram illustrating an example of synchronization signal block (SSB) locations, in accordance with the present disclosure.

FIG. 5 is a diagram illustrating an example 500 of SSB locations, in accordance with the present disclosure. In particular, example 500 shows SSB locations within a half frame that is 5 ms in length. The time domain location (e.g., slots and/or OFDM symbols) of an SSB (e.g., within a 5 ms half frame) may be according to a defined (e.g., fixed) pattern. As shown in example 500, the time domain locations of SSB s may be based at least in part on a subcarrier spacing (SCS), which may be 15 kHz or 30 kHz in FR1, 120 kHz or 240 kHz in FR2, and/or the like. For example, for a 120 kHz SCS, there may be 64 SSBs in a 5 ms half frame, and FIG. 5 shows an example pattern for four SSBs (SSBs 0-3, where 0-3 refer to SSB indices) in two slots at the 120 kHz SCS. As another example, for a 240 kHz SCS, there may be 64 SSBs in a 5 ms half frame, and FIG. 5 shows an example pattern for eight SSBs (SSBs 0-7, where 0-7 refer to SSB indices) in four slots at the 240 kHz SCS.

The time domain locations for SSBs, according to the patterns described above, are possible locations for SSBs. Accordingly, any set of the time domain locations may be used for actual SSB transmissions. In this case, a UE may receive an indication of the time domain locations where SSBs are to be transmitted. For example, the indication may identify the SSB positions (e.g., SSB indices) where SSBs are to be transmitted, and the SSB positions may correspond to the time domain locations of a pattern, as described above. In some aspects, the indication (e.g., ssb-PositionsInBurst) may be in a system information block (SIB) message (e.g., a SIB1 message) or a serving cell configuration common (ServingCellConfigCommon) message.

In some aspects, a UE may refrain from monitoring a PDCCH candidate when at least one RE of the PDCCH candidate overlaps with at least one RE of a time domain location (e.g., associated with an SSB index) for an SSB transmission indicated to the UE (e.g., in ssb-PositionsInBurst). In some aspects, a UE may rate match a PDSCH around physical resource blocks (PRBs) containing an SSB transmission (e.g., according to an SSB index provided in ssb-PositionsInBurst) when the PDSCH resource allocation overlaps with the PRBs containing the SSB transmission.

As indicated above, FIG. 5 is provided as an example. Other examples may differ from what is described with regard to FIG. 5.

Figure 6:
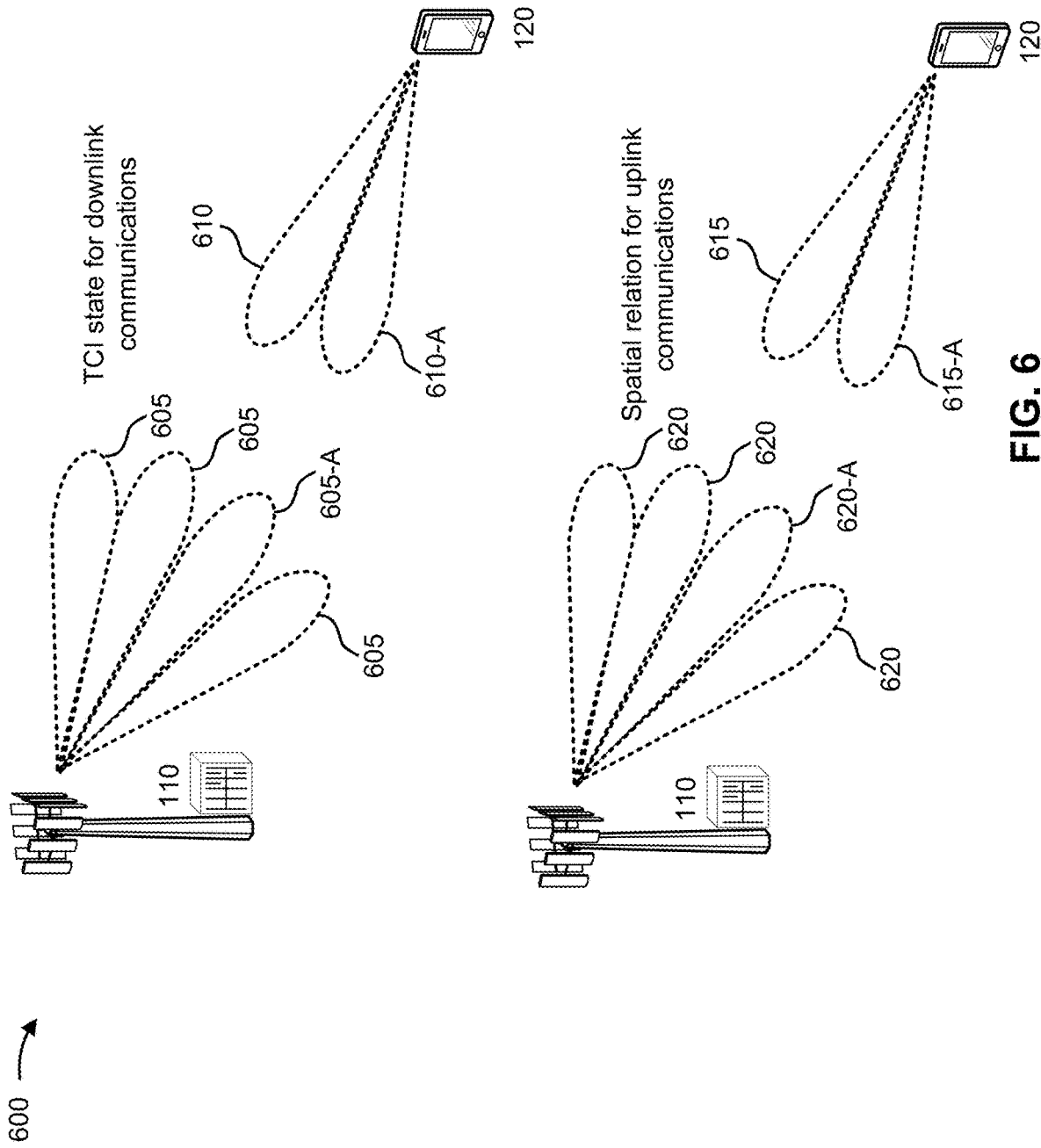
FIG. 6 is a diagram illustrating an example of using beams for communications between a base station and a UE, in accordance with the present disclosure.

FIG. 6 is a diagram illustrating an example 600 of using beams for communications between a base station and a UE, in accordance with the present disclosure. As shown in FIG. 6, a base station 110 and a UE 120 may communicate with one another.

The base station 110 may transmit to UEs 120 located within a coverage area of the base station 110. The base station 110 and the UE 120 may be configured for beamformed communications, where the base station 110 may transmit in the direction of the UE 120 using a directional BS transmit beam, and the UE 120 may receive the transmission using a directional UE receive beam. Each BS transmit beam may have an associated beam ID, beam direction, or beam symbols, among other examples. The base station 110 may transmit downlink communications via one or more BS transmit beams 605.

The UE 120 may attempt to receive downlink transmissions via one or more UE receive beams 610, which may be configured using different beamforming parameters at receive circuitry of the UE 120. The UE 120 may identify a particular BS transmit beam 605, shown as BS transmit beam 605-A, and a particular UE receive beam 610, shown as UE receive beam 610-A, that provide relatively favorable performance (for example, that have a best channel quality of the different measured combinations of BS transmit beams 605 and UE receive beams 610). In some examples, the UE 120 may transmit an indication of which BS transmit beam 605 is identified by the UE 120 as a preferred BS transmit beam, which the base station 110 may select for transmissions to the UE 120. The UE 120 may thus attain and maintain a beam pair link (BPL) with the base station 110 for downlink communications (for example, a combination of the BS transmit beam 605-A and the UE receive beam 610-A), which may be further refined and maintained in accordance with one or more established beam refinement procedures.

A downlink beam, such as a BS transmit beam 605 or a UE receive beam 610, may be associated with a transmission configuration indication (TCI) state. A TCI state may indicate a directionality or a characteristic of the downlink beam, such as one or more quasi-co-location (QCL) properties of the downlink beam. A QCL property may include, for example, a Doppler shift, a Doppler spread, an average delay, a delay spread, or spatial receive parameters, among other examples. In some examples, each BS transmit beam 605 may be associated with an SSB, and the UE 120 may indicate a preferred BS transmit beam 605 by transmitting uplink transmissions that are associated with the preferred BS transmit beam 605. A particular SSB may have an associated TCI state (for example, for an antenna port or for beamforming). The base station 110 may, in some examples, indicate a downlink BS transmit beam 605 based at least in part on antenna port QCL properties that may be indicated by the TCI state. A TCI state may be associated with one downlink reference signal set (for example, an SSB and an aperiodic, periodic, or semi-persistent channel state information reference signal (CSI-RS)) for different QCL types (for example, QCL types for different combinations of Doppler shift, Doppler spread, average delay, delay spread, or spatial receive parameters, among other examples). In cases where the QCL type indicates spatial receive parameters, the QCL type may correspond to analog receive beamforming parameters of a UE receive beam 610 at the UE 120. Thus, the UE 120 may select a corresponding UE receive beam 610 from a set of BPLs based at least in part on the base station 110 indicating a BS transmit beam 605 via a TCI indication.

The base station 110 may maintain a set of activated TCI states for downlink shared channel transmissions and a set of activated TCI states for downlink control channel transmissions. The set of activated TCI states for downlink shared channel transmissions may correspond to beams that the base station 110 uses for downlink transmission on a PDSCH. The set of activated TCI states for downlink control channel communications may correspond to beams that the base station 110 may use for downlink transmission on a PDCCH or in a CORESET. The UE 120 may also maintain a set of activated TCI states for receiving the downlink shared channel transmissions and the CORESET transmissions. If a TCI state is activated for the UE 120, then the UE 120 may have one or more antenna configurations based at least in part on the TCI state, and the UE 120 may not need to reconfigure antennas or antenna weighting configurations. In some examples, the set of activated TCI states (for example, activated PDSCH TCI states and activated CORESET TCI states) for the UE 120 may be configured by a configuration message, such as an RRC message.

Similarly, for uplink communications, the UE 120 may transmit in the direction of the base station 110 using a directional UE transmit beam, and the base station 110 may receive the transmission using a directional BS receive beam. Each UE transmit beam may have an associated beam ID, beam direction, or beam symbols, among other examples. The UE 120 may transmit uplink communications via one or more UE transmit beams 615.

The base station 110 may receive uplink transmissions via one or more BS receive beams 620. The base station 110 may identify a particular UE transmit beam 615, shown as UE transmit beam 615-A, and a particular BS receive beam 620, shown as BS receive beam 620-A, that provide relatively favorable performance (for example, that have a best channel quality of the different measured combinations of UE transmit beams 615 and BS receive beams 620). In some examples, the base station 110 may transmit an indication of which UE transmit beam 615 is identified by the base station 110 as a preferred UE transmit beam, which the base station 110 may select for transmissions from the UE 120. The UE 120 and the base station 110 may thus attain and maintain a BPL for uplink communications (for example, a combination of the UE transmit beam 615-A and the BS receive beam 620-A), which may be further refined and maintained in accordance with one or more established beam refinement procedures. An uplink beam, such as a UE transmit beam 615 or a BS receive beam 620, may be associated with a spatial relation. A spatial relation may indicate a directionality or a characteristic of the uplink beam, similar to one or more QCL properties, as described above.

As indicated above, FIG. 6 is provided as an example. Other examples may differ from what is described with respect to FIG. 6.

In some wireless systems (e.g., according to 3GPP Release 15 or Release 16), a PDCCH may be associated with a single TCI state. For example, a PDCCH candidate may be defined in a search space set, a search space set may be associated with a single CORESET, and the CORESET may be associated with a single TCI state that is configured and activated for the CORESET.

However, it is possible that a PDCCH may be associated with a plurality of (e.g., two) TCI states. In this case, a CORESET may be associated with a plurality of (e.g., two) TCI states, a search space set may be associated with a plurality of (e.g., two) CORESETs (and the plurality of CORESETs are associated with different TCI states), a PDCCH candidate may be defined across a plurality of (e.g., two) search space sets, and/or the like. Accordingly, some REGs (e.g., a first set of REGs) of a PDCCH candidate may be associated with a first TCI state, and other REGs (e.g., a second set of REGs) of the PDCCH candidate may be associated with a second TCI state. The first set of REGs and the second set of REGs may be multiplexed in a frequency domain or multiplexed in a time domain. A set of REGs of a PDCCH candidate (e.g., a set of REGs associated with a particular TCI state) may also be referred to as a PDCCH transmission occasion or a PDCCH repetition.

In some aspects, a TCI state may be defined by QCL information that configures a reference signal, such as a CSI-RS resource and/or an SSB index. In some aspects, a first set (e.g., a primary set) of SSBs may be associated with (e.g., defined or specified for) a serving cell, and a second set (e.g., a secondary set) of SSBs may be associated with a non-serving cell. A physical cell identifier (PCI) for a serving cell may be determined from a PSS and an SSS of an initial access procedure, as described above. A PCI for a non-serving cell may be RRC-configured. In addition, a secondary SSB set may be configured for a UE and associated with the PCI for the non-serving cell. Moreover, the UE may receive an indication of which SSB indices from the secondary SSB set are to be transmitted (e.g., a secondary ssb-PositionsInBurst may be configured for the secondary SSB set). In this way, multiple TRP (multi-TRP) SSB transmission may be enabled, where the multiple TRPs are associated with different PCIs (e.g., inter-cell multi-TRP transmission). In some aspects, a plurality of TCI states associated with a PDCCH candidate may be associated with the same PCI or different PCIs (e.g., a serving cell PCI and a non-serving cell PCI associated with the same component carrier).

In current wireless systems, a UE may not be enabled to determine whether to monitor a PDCCH candidate that includes a plurality of (e.g., two) sets of REGs associated with different TCI states. For example, the UE may not be enabled to determine whether to monitor the PDCCH candidate when an SSB indicated for actual transmission is to collide with one or more of the plurality of sets of REGs. Some techniques and apparatuses described herein enable a UE to determine whether to monitor a PDCCH candidate when an indicated SSB is to collide with one or more of a plurality of sets of REGs of the PDCCH candidate. In this way, collisions between SSBs and PDCCHs may be avoided, thereby improving a performance of SSBs and/or communications carried in a PDCCH. In addition, PDCCHs may be utilized more efficiently (e.g., if an SSB is to collide with one set of REGs but not another set of REGs), thereby conserving network resources.

Figure 7A:
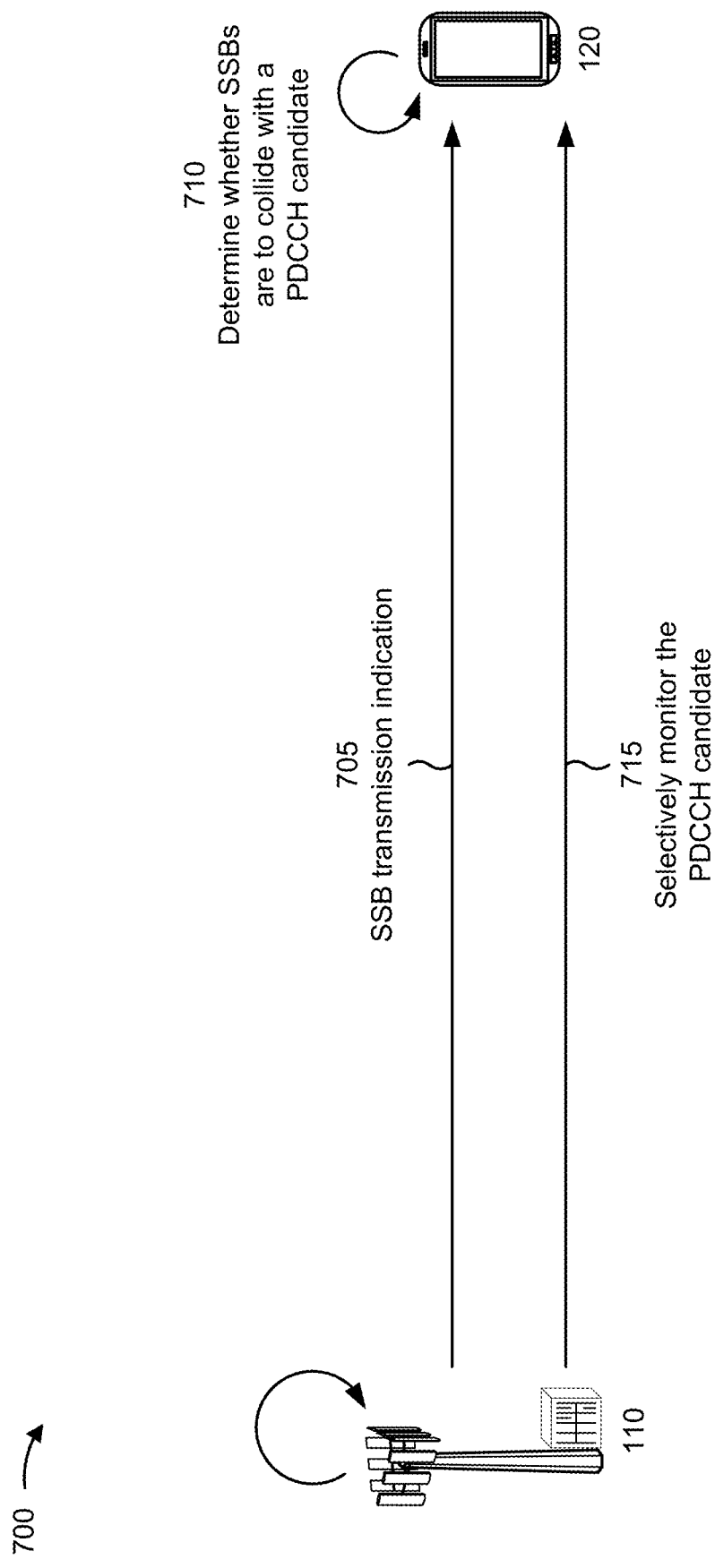
FIGS. 7A-7C are diagrams illustrating examples associated with physical downlink control channel (PDCCH) and SSB collision, in accordance with the present disclosure.
Figure 7B:
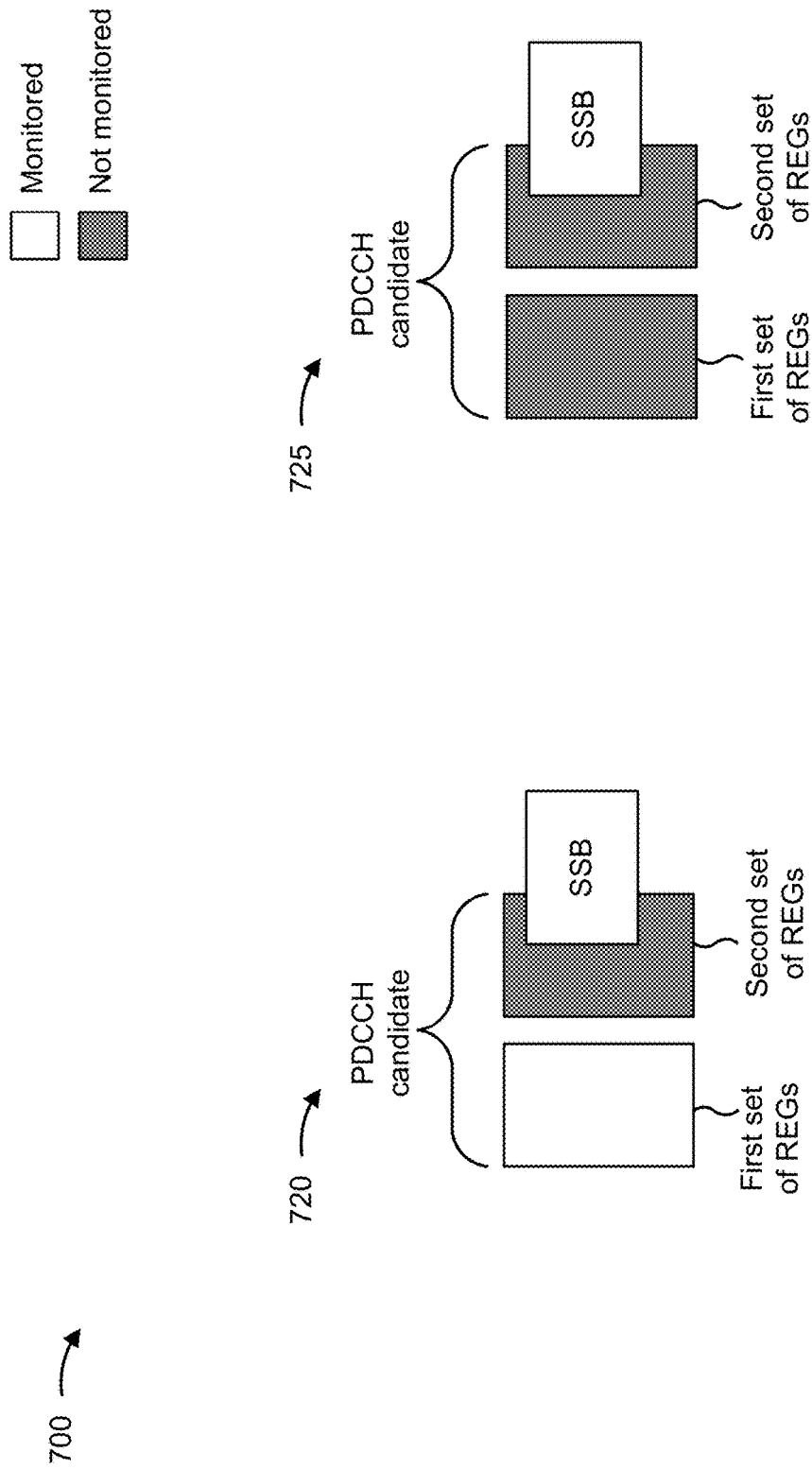
Figure 7C:
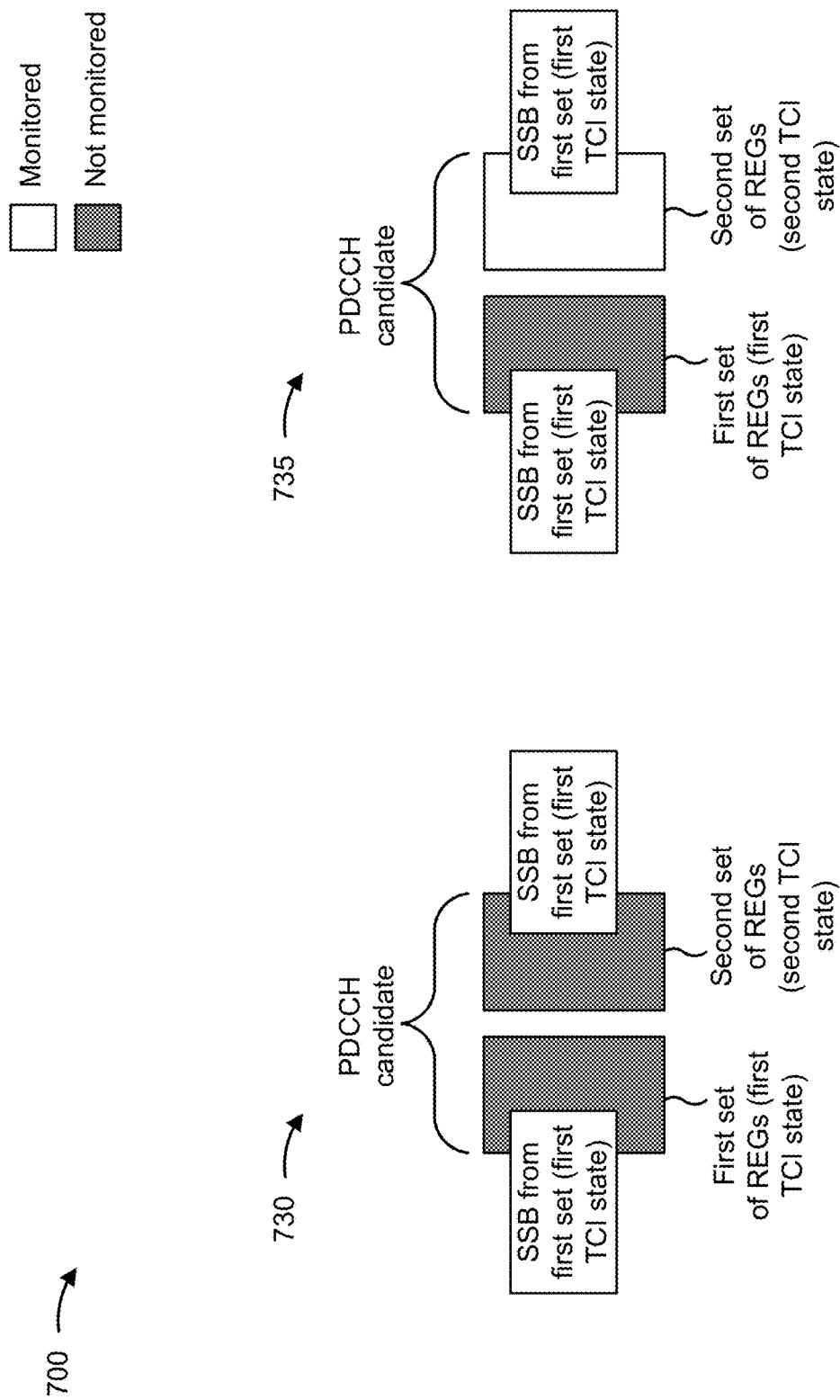

FIGS. 7A-7C are diagrams illustrating examples 700 of PDCCH and SSB collision, in accordance with the present disclosure. As shown in FIG. 7A, a base station 110 and a UE 120 may communicate with one another. In some aspects, the base station 110 may be associated with a serving cell for the UE 120, and the serving cell may be associated with a PCI. In some aspects, the base station 110, or another base station 110, may be associated with a non-serving cell for the UE 120, and the non-serving cell may be associated with a different PCI. In some aspects, the serving cell and the non-serving cell may be associated with the same component carrier. In some aspects, the UE 120 may be configured to monitor a set of PDCCH candidates, and each PDCCH candidate may include a plurality of (e.g., two) sets of REGs that are associated with respective TCI states. For example, each PDCCH candidate may include a first set of REGs associated with a first TCI state, a second set of REGs associated with a second TCI state, and so forth.

As shown in FIG. 7A, and by reference number 705, the base station 110 may transmit, and the UE 120 may receive, information (e.g., ssb-PositionsInBurst) indicating one or more SSBs, of a set of SSBs, that are to be transmitted (e.g., actually transmitted) by the base station 110. In some aspects, the base station 110 may transmit to the UE 120 first information (e.g., a first ssb-PositionsInBurst) indicating one or more SSBs, of a first set of SSBs associated with a first PCI, that are to be transmitted by the base station 110, and the base station 110 (or another base station 110) may transmit to the UE 120 second information (e.g., a second ssb-PositionsInBurst) indicating one or more SSBs, of a second set of SSBs associated with a second PCI, that are to be transmitted by the base station 110 (or the other base station 110).

In some aspects, the information (e.g., the first information and/or the second information) may identify one or more SSB indices of a set of SSBs (e.g., an SSB burst set) configured for the UE 120. The one or more SSB indices may identify resource locations (e.g., time domain locations) in which SSBs are to be transmitted (e.g., according to a pattern of SSB positions, as described above). In some aspects, the one or more SSB indices may be identified by SSB positions in an SSB burst set (e.g., ssb-PositionsInBurst). For example, the information may include a bitmap that identifies the SSB indices, of a set of SSBs, that are to be transmitted. In some aspects, the information (e.g., ssb- PositionsInBurst) may be carried in a system information message (e.g., a SIB1 message) or in an RRC configuration, such as a serving cell common configuration (e.g., Serving-CellConfigCommon) message.

As shown by reference number 710, the UE 120 may determine whether the one or more SSBs that are to be transmitted (e.g., the one or more SSB indices) are to collide with a PDCCH candidate (e.g., whether at least one of the one or more SSBs is to collide with the PDCCH candidate). For example, the UE 120 may determine whether an SSB is to collide with one or more of a plurality of (e.g., two) sets of REGs (e.g., a plurality of PDCCH transmission occasions, a plurality of PDCCH repetitions, and/or the like) of the PDCCH candidate. As an example, the UE 120 may determine whether an SSB is to collide with a first set of REGs of the PDCCH candidate, whether an SSB is to collide with a second set of REGs of the PDCCH candidate, and so forth.

In some aspects, an SSB may collide with a set of REGs when at least one RE in which the SSB is to be transmitted overlaps with at least one RE of the set of REGs. As described above, the plurality of sets of REGs may be associated with respective TCI states. For example, a first set of REGs of the PDCCH candidate may be associated with a first TCI state, a second set of REGs of the PDCCH candidate may be associated with a second TCI state, and so forth.

In some aspects, the base station 110 may determine whether the one or more SSBs that are to be transmitted (e.g., the one or more SSB indices) are to collide with a PDCCH candidate for the UE 120 (e.g., whether at least one of the one or more SSBs is to collide with the PDCCH candidate), in a manner similar to that described above. In this way, the base station 110 may determine the PDCCH candidates, and/or the sets of REGs of a PDCCH candidate, that the UE 120 is to monitor.

As shown by reference number 715, the UE 120 may selectively monitor (e.g., monitor or refrain from monitoring) the PDCCH candidate based at least in part on determining whether at least one of the one or more SSBs that are to be transmitted (e.g., the one or more SSB indices) is to collide with the PDCCH candidate. For example, the UE 120 may selectively monitor one or more of the plurality of sets of REGs of the PDCCH candidate based at least in part on determining whether at least one of the one or more SSBs is to collide with the one or more of the plurality of sets of REGs. As an example, the UE 120 may selectively monitor a first set of REGs of the PDCCH candidate based at least in part on determining whether an SSB is to collide with the first set of REGs, selectively monitor a second set of REGs of the PDCCH candidate based at least in part on determining whether an SSB is to collide with the second set of REGs, and so forth.

In some aspects, as also shown by reference number 715, the base station 110 may transmit in the PDCCH candidate based at least in part on determining whether the UE 120 is to monitor the PDCCH candidate. For example, the base station 110 may transmit in one or more of the plurality of sets of REGs of the PDCCH candidate based at least in part on determining whether the UE 120 is to monitor the one or more of the plurality of sets of REGs. As an example, the base station 110 may transmit in a first set of REGs of the PDCCH candidate based at least in part on determining whether the UE 120 is to monitor the first set of REGs, transmit in a second set of REGs of the PDCCH candidate based at least in part on determining whether the UE 120 is to monitor the second set of REGs, and so forth.

As described above, the base station 110 may determine whether the UE 120 is to monitor the PDCCH candidate, or monitor a set of REGs of the PDCCH candidate, based at least in part on determining whether an SSB is to collide with the PDCCH candidate and/or the set of REGs. In some aspects, the base station 110 may transmit a PDCCH (e.g., carrying downlink control information) in the PDCCH candidate or in one or more sets of REGs of the PDCCH candidate (e.g., based at least in part on determining that there is no SSB collision in the PDCCH candidate and/or in the one or more sets of REGs of the PDCCH candidate).

FIG. 7B shows examples in which the UE 120 selectively monitors the PDCCH candidate. As shown in FIG. 7B, the PDCCH candidate may include a first set of REGs and a second set of REGs associated with different TCI states. In some aspects, the PDCCH candidate may include additional sets of REGs (e.g., a third set of REGs associated with a TCI state, and so forth).

In some aspects, the UE 120 may monitor the PDCCH candidate in a first set of REGs of the PDCCH candidate, and not in a second set of REGs of the PDCCH candidate, when an SSB (e.g., an SSB index indicated by ssb-PositionsInBurst) is to collide with the second set of REGs and is not to collide with the first set of REGs (this may be referred to herein as Technique 1). For example, as shown by example 720, an SSB may collide with the second set of REGs of the PDCCH candidate, but the SSB may not collide with the first set of REGs of the PDCCH candidate. Accordingly, the UE 120 may monitor the PDCCH candidate in the first set of REGs (e.g., regardless of the SSB collision with the second set of REGs), and may not monitor the PDCCH candidate in the second set of REGs (e.g., because of the SSB collision with the second set of REGs). In this way, if only one set of REGs of the PDCCH candidate collides with an SSB, the UE 120 monitors the PDCCH candidate in the other set of REGs that does not collide with an SSB. Accordingly, if the PDCCH candidate collides with one or more SSBs, the UE 120 does not drop the PDCCH candidate unless all sets of REGs of the PDCCH candidate collide (e.g., overlap) with the one or more SSBs.

In some aspects, the UE 120 may not monitor the PDCCH candidate (e.g., may not monitor the PDCCH candidate in any set of REGs of the plurality of sets of REGs) when an SSB collides with at least one of the plurality of sets of REGs (this may be referred to herein as Technique 2). For example, as shown by example 725, an SSB may collide with the second set of REGs of the PDCCH candidate, but the SSB may not collide with the first set of REGs of the PDCCH candidate. Accordingly, the UE 120 may not monitor the PDCCH candidate in the first set of REGs and the second set of REGs (e.g., because of the SSB collision with the second set of REGs). In this way, if at least one set of REGs of the PDCCH candidate collides with an SSB, the UE 120 does not monitor the PDCCH candidate.

In some aspects, the UE 120 may receive a configuration (e.g., via an RRC message), from the base station 110, that indicates whether the UE 120 is to use Technique 1 or Technique 2 for determining whether to monitor a PDCCH candidate. In some aspects, the UE 120 may determine whether the UE 120 is to use Technique 1 or Technique 2 for determining whether to monitor a PDCCH candidate based at least in part on a capability of the UE 120.

FIG. 7C shows examples in which the UE 120 selectively monitors the PDCCH candidate. As shown in FIG. 7C, the PDCCH candidate may include a first set of REGs and a second set of REGs associated with different TCI states. In some aspects, the PDCCH candidate may include additional sets of REGs (e.g., a third set of REGs associated with a TCI state, and so forth).

Moreover, in FIG. 7C, SSBs that are to be transmitted (e.g., actually transmitted) may be associated with different sets of SSBs (e.g., different SSB burst sets). For example, one or more first SSBs (e.g., one or more first SSB indices) that are to be transmitted may be associated with a first set of SSBs, and one or more second SSBs (e.g., one or more second SSB indices) that are to be transmitted may be associated with a second set of SSBs. In some aspects, the SSBs that are to be transmitted may be associated with additional sets of SSBs (e.g., a third set of SSBs, and so forth). In some aspects, the first set of SSBs may be associated with a first TCI state that is also associated with the first set of REGs, and the second set of SSBs may be associated with a second TCI state that is also associated with the second set of REGs.

In some aspects, the first set of SSBs and the second set of SSBs may be associated with the same PCI. For example, the first set of SSBs and the second set of SSBs may be subsets of a set of SSBs associated with a serving cell. In this case, the base station 110 may transit information that indicates (e.g., using a single indication, such as a single ssb-PositionsInBurst parameter) SSBs (e.g., SSB indices), of the set of SSBs, that are to be transmitted for the serving cell. In some aspects, the indicated SSBs may be configured to be associated with either the first set of SSBs or the second set of SSBs.

In some aspects, the first set of SSBs and the second set of SSBs may be associated with different PCIs. For example, the first set of SSBs may be associated with a serving cell PCI, and the second set of SSBs may be associated with a non-serving cell PCI (e.g., of the same component carrier). In this case, the base station 110 may transmit information that indicates (e.g., using a first indication, such as a first ssb-PositionsInBurst parameter, associated with a first PCI) SSBs (e.g., SSB indices), of the first set of SSBs, that are to be transmitted for the serving cell. Additionally, the base station 110, or another base station 110, may transit information that indicates (e.g., using a second indication, such as a second ssb-PositionsInBurst parameter, associated with a second PCI) SSBs (e.g., SSB indices), of the second set of SSBs, that are to be transmitted for the non-serving cell.

In some aspects, the UE 120 may not monitor the PDCCH candidate in a set of REGs of the PDCCH candidate when an SSB is to collide with the set of REGs, regardless of whether a TCI state, associated with the set of REGs, is also associated with a set of SSBs that includes the SSB (this may be referred to herein as Technique 3). For example, as shown by example 730, an SSB from the first set of SSBs (associated with the first TCI state) may collide with the first set of REGs (associated with the first TCI state) of the PDCCH candidate, and an SSB from the first set of SSBs may collide with the second set of REGs (associated with the second TCI state) of the PDCCH candidate. Accordingly, the UE 120 may not monitor the PDCCH candidate in the first set of REGs, and may not monitor the PDCCH candidate in the second set of REGs (e.g., even though the second set of REGs is associated with a different TCI state than the first set of SSBs to which the colliding SSB belongs).

In some aspects, the UE 120 may monitor the PDCCH candidate in a set of REGs of the PDCCH candidate when an SSB is to collide with the set of REGs, and a TCI state, associated with the set of REGs, is not associated with a set of SSBs that includes the SSB (this may be referred to herein as Technique 4). Conversely, the UE 120 may not monitor the PDCCH candidate in a set of REGs of the PDCCH candidate when an SSB is to collide with the set of REGs, and a TCI state, associated with the set of REGs, is also associated with a set of SSBs that includes the SSB. For example, as shown by example 735, an SSB from the first set of SSBs (associated with the first TCI state) may collide with the first set of REGs (associated with the first TCI state) of the PDCCH candidate, and an SSB from the first set of SSBs may collide with the second set of REGs (associated with the second TCI state) of the PDCCH candidate. Accordingly, the UE 120 may not monitor the PDCCH candidate in the first set of REGs (e.g., because the first set of REGs is associated with the same TCI state as the first set of SSBs to which the colliding SSB belongs), and may monitor the PDCCH candidate in the second set of REGs (e.g., because the second set of REGs is associated with a different TCI state from the first set of SSBs to which the colliding SSB belongs).

In some aspects, the UE 120 may receive a configuration (e.g., via an RRC message), from the base station 110, that indicates whether the UE 120 is to use Technique 3 or Technique 4 for determining whether to monitor a PDCCH candidate. In some aspects, the UE 120 may determine whether the UE 120 is to use Technique 3 or Technique 4 for determining whether to monitor a PDCCH candidate based at least in part on a capability of the UE 120.

As indicated above, FIGS. 7A-7C is provided as an example. Other examples may differ from what is described with respect to FIGS. 7A-7C.

Figure 8:
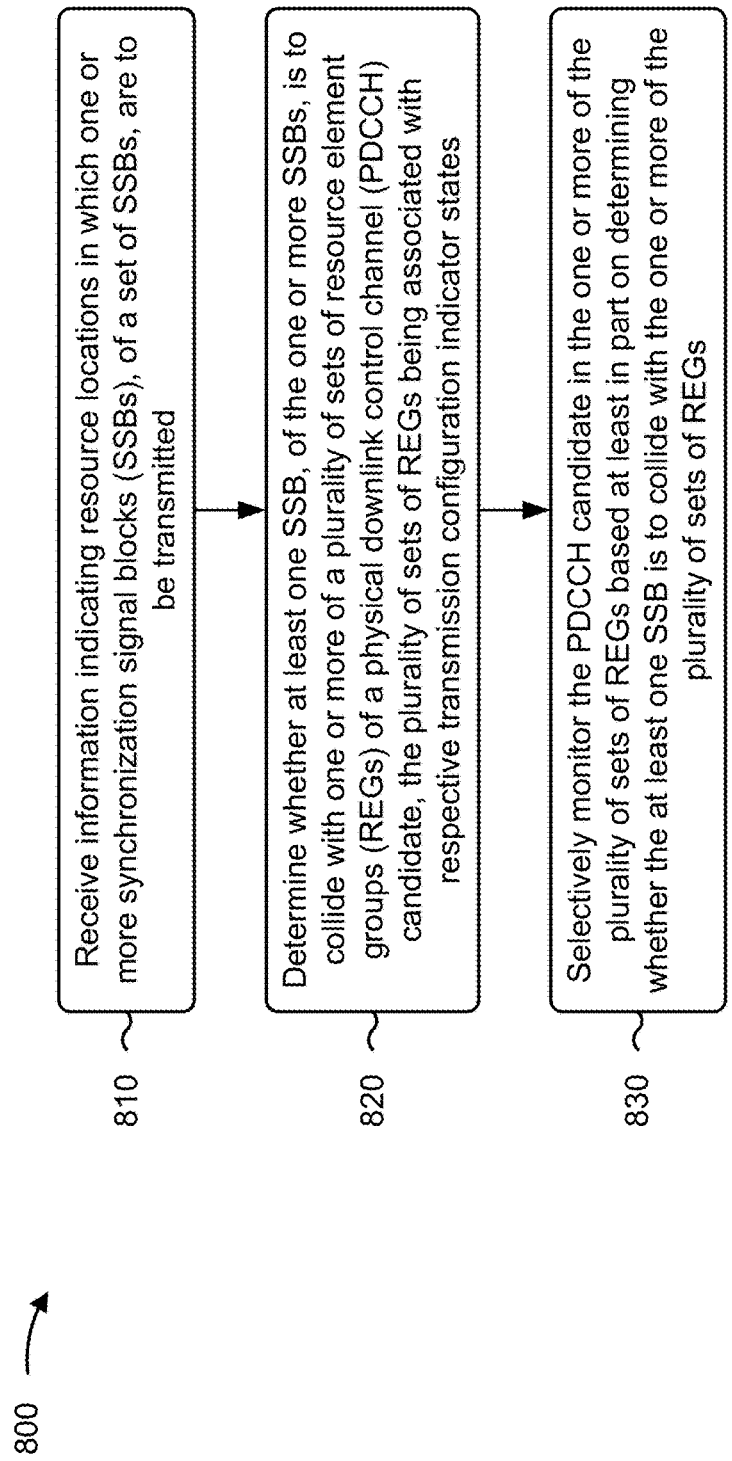
FIGS. 8 and 9 are diagrams illustrating example processes associated with PDCCH and SSB collision, in accordance with the present disclosure.

FIG. 8 is a diagram illustrating an example process 800 performed, for example, by a UE, in accordance with the present disclosure. Example process 800 is an example where the UE (e.g., UE 120 and/or the like) performs operations associated with PDCCH and SSB collision.

As shown in FIG. 8, in some aspects, process 800 may include receiving information indicating resource locations in which one or more SSBs, of a set of SSBs, are to be transmitted (block 810). For example, the UE (e.g., using antenna 252, DEMOD 254, MIMO detector 256, receive processor 258, controller/processor 280, and/or the like) may receive information indicating resource locations in which one or more SSBs, of a set of SSBs, are to be transmitted, as described above.

As further shown in FIG. 8, in some aspects, process 800 may include determining whether at least one SSB, of the one or more SSBs, is to collide with one or more of a plurality of sets of REGs of a PDCCH candidate, the plurality of sets of REGs being associated with respective TCI states (block 820). For example, the UE (e.g., using receive processor 258, transmit processor 264, controller/processor 280, memory 282, and/or the like) may determine whether at least one SSB, of the one or more SSBs, is to collide with one or more of a plurality of sets of REGs of a PDCCH candidate, as described above. In some aspects, the plurality of sets of REGs are associated with respective TCI states.

As further shown in FIG. 8, in some aspects, process 800 may include selectively monitoring the PDCCH candidate in the one or more of the plurality of sets of REGs based at least in part on determining whether the at least one SSB is to collide with the one or more of the plurality of sets of REGs (block 830). For example, the UE (e.g., using antenna 252, DEMOD 254, MIMO detector 256, receive processor 258, controller/processor 280, and/or the like) may selectively monitor the PDCCH candidate in the one or more of the plurality of sets of REGs based at least in part on determining whether the at least one SSB is to collide with the one or more of the plurality of sets of REGs, as described above.

Process 800 may include additional aspects, such as any single aspect or any combination of aspects described below and/or in connection with one or more other processes described elsewhere herein.

In a first aspect, the plurality of sets of REGs includes a first set of REGs and a second set of REGs, and the PDCCH candidate is monitored in the first set of REGs and not in the second set of REGs when the at least one SSB is to collide with the second set of REGs and is not to collide with the first set of REGs.

In a second aspect, alone or in combination with the first aspect, the PDCCH candidate is not monitored when the at least one SSB is to collide with at least one of the plurality of sets of REGs.

In a third aspect, alone or in combination with one or more of the first and second aspects, the PDCCH candidate is not monitored in a set of REGs of the PDCCH candidate when the at least one SSB is to collide with the set of REGs, regardless of whether a TCI state, associated with the set of REGs, is also associated with the set of SSBs.

In a fourth aspect, alone or in combination with one or more of the first through third aspects, the PDCCH candidate is monitored in a set of REGs of the PDCCH candidate when the at least one SSB is to collide with the set of REGs, and a TCI state, associated with the set of REGs, is not associated with the set of SSBs.

In a fifth aspect, alone or in combination with one or more of the first through fourth aspects, the PDCCH candidate is not monitored in a set of REGs of the PDCCH candidate when the at least one SSB is to collide with the set of REGs, and a TCI state, associated with the set of REGs, is also associated with the set of SSBs.

In a sixth aspect, alone or in combination with one or more of the first through fifth aspects, a first set of REGs of the PDCCH candidate is associated with a first TCI state that is also associated with a first set of SSBs, and a second set of REGs of the PDCCH candidate is associated with a second TCI state that is also associated with a second set of SSBs.

In a seventh aspect, alone or in combination with one or more of the first through sixth aspects, the first set of SSBs is associated with a first PCI and the second set of SSBs is associated with a second PCI.

In an eighth aspect, alone or in combination with one or more of the first through seventh aspects, receiving the information includes receiving first information, associated with the first PCI, indicating resource locations in which SSBs of the first set of SSBs are to be transmitted, and receiving second information, associated with the second PCI, indicating resource locations in which SSBs of the second set of SSBs are to be transmitted.

In a ninth aspect, alone or in combination with one or more of the first through eighth aspects, the first set of SSBs and the second set of SSBs are associated with a same PCI.

In a tenth aspect, alone or in combination with one or more of the first through ninth aspects, selectively monitoring the PDCCH candidate in the one or more of the plurality of sets of REGs is further based at least in part on an RRC configuration or a capability of the UE.

In an eleventh aspect, alone or in combination with one or more of the first through tenth aspects, the information is received in a SIB or an RRC configuration.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
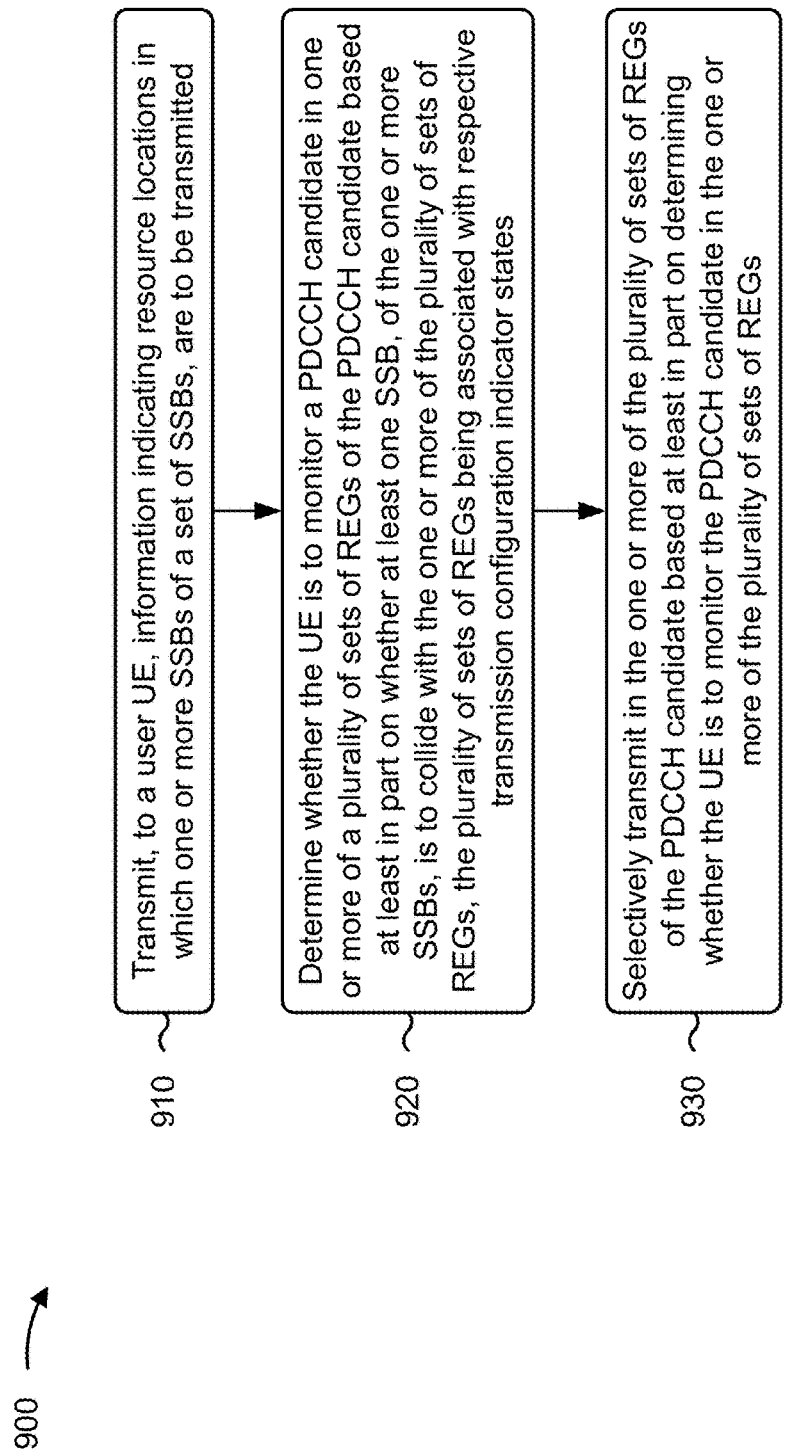

FIG. 9 is a diagram illustrating an example process 900 performed, for example, by a base station, in accordance with the present disclosure. Example process 900 is an example where the base station (e.g., base station 110 and/or the like) performs operations associated with PDCCH and SSB collision.

As shown in FIG. 9, in some aspects, process 900 may include transmitting, to a UE, information indicating resource locations in which one or more SSBs, of a set of SSBs, are to be transmitted (block 910). For example, the base station (e.g., using controller/processor 240, transmit processor 220, TX MIMO processor 230, MOD 232, antenna 234, and/or the like) may transmit, to a UE, information indicating resource locations in which one or more SSBs, of a set of SSBs, are to be transmitted, as described above.

As further shown in FIG. 9, in some aspects, process 900 may include determining whether the UE is to monitor a PDCCH candidate in one or more of a plurality of sets of REGs of the PDCCH candidate based at least in part on whether at least one SSB, of the one or more SSBs, is to collide with the one or more of the plurality of sets of REGs, the plurality of sets of REGs being associated with respective TCI states (block 920). For example, the base station (e.g., using transmit processor 220, receive processor 238, controller/processor 240, memory 242, and/or the like) may determine whether the UE is to monitor a PDCCH candidate in one or more of a plurality of sets of REGs of the PDCCH candidate based at least in part on whether at least one SSB, of the one or more SSBs, is to collide with the one or more of the plurality of sets of REGs, as described above. In some aspects, the plurality of sets of REGs are associated with respective TCI states.

As further shown in FIG. 9, in some aspects, process 900 may include selectively transmitting in the one or more of the plurality of sets of REGs of the PDCCH candidate based at least in part on determining whether the UE is to monitor the PDCCH candidate in the one or more of the plurality of sets of REGs (block 930). For example, the base station (e.g., using controller/processor 240, transmit processor 220, TX MIMO processor 230, MOD 232, antenna 234, and/or the like) may selectively transmit in the one or more of the plurality of sets of REGs of the PDCCH candidate based at least in part on determining whether the UE is to monitor the PDCCH candidate in the one or more of the plurality of sets of REGs, as described above.

Process 900 may include additional aspects, such as any single aspect or any combination of aspects described below and/or in connection with one or more other processes described elsewhere herein.

In a first aspect, the plurality of sets of REGs includes a first set of REGs and a second set of REGs, and the PDCCH candidate is to be monitored in the first set of REGs and not in the second set of REGs when the at least one SSB is to collide with the second set of REGs and is not to collide with the first set of REGs.

In a second aspect, alone or in combination with the first aspect, the PDCCH candidate is not to be monitored when the at least one SSB is to collide with at least one of the plurality of sets of REGs.

In a third aspect, alone or in combination with one or more of the first and second aspects, the PDCCH candidate is not to be monitored in a set of REGs of the PDCCH candidate when the at least one SSB is to collide with the set of REGs, regardless of whether a TCI state, associated with the set of REGs, is also associated with the set of SSBs.

In a fourth aspect, alone or in combination with one or more of the first through third aspects, the PDCCH candidate is to be monitored in a set of REGs of the PDCCH candidate when the at least one SSB is to collide with the set of REGs, and a TCI state, associated with the set of REGs, is not associated with the set of SSBs.

In a fifth aspect, alone or in combination with one or more of the first through fourth aspects, the PDCCH candidate is not to be monitored in a set of REGs of the PDCCH candidate when the at least one SSB is to collide with the set of REGs, and a TCI state, associated with the set of REGs, is also associated with the set of SSBs.

In a sixth aspect, alone or in combination with one or more of the first through fifth aspects, a first set of REGs of the PDCCH candidate is associated with a first TCI state that is also associated with a first set of SSBs, and a second set of REGs of the PDCCH candidate is associated with a second TCI state that is also associated with a second set of SSBs.

In a seventh aspect, alone or in combination with one or more of the first through sixth aspects, the first set of SSBs is associated with a first PCI and the second set of SSBs is associated with a second PCI.

In an eighth aspect, alone or in combination with one or more of the first through seventh aspects, transmitting the information includes transmitting first information, associated with the first PCI, indicating resource locations in which SSBs of the first set of SSBs are to be transmitted, and transmitting second information, associated with the second PCI, indicating resource locations in which SSBs of the second set of SSBs are to be transmitted.

In a ninth aspect, alone or in combination with one or more of the first through eighth aspects, the first set of SSBs and the second set of SSBs are associated with a same PCI.

In a tenth aspect, alone or in combination with one or more of the first through ninth aspects, determining whether the UE is to monitor the PDCCH candidate in the one or more of the plurality of sets of REGs is further based at least in part on an RRC configuration for the UE or a capability of the UE.

In an eleventh aspect, alone or in combination with one or more of the first through tenth aspects, the information is transmitted in a SIB or an RRC configuration.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The following provides an overview of some Aspects of the present disclosure:

Aspect 1: A method of wireless communication performed by a user equipment (UE), comprising: receiving information indicating resource locations in which one or more synchronization signal blocks (SSBs), of a set of SSBs, are to be transmitted; determining whether at least one SSB, of the one or more SSBs, is to collide with one or more of a plurality of sets of resource element groups (REGs) of a physical downlink control channel (PDCCH) candidate, the plurality of sets of REGs being associated with respective transmission configuration indicator (TCI) states; and selectively monitoring the PDCCH candidate in the one or more of the plurality of sets of REGs based at least in part on determining whether the at least one SSB is to collide with the one or more of the plurality of sets of REGs.

Aspect 2: The method of Aspect 1, wherein the plurality of sets of REGs includes a first set of REGs and a second set of REGs, and the PDCCH candidate is monitored in the first set of REGs and not in the second set of REGs when the at least one SSB is to collide with the second set of REGs and is not to collide with the first set of REGs.

Aspect 3: The method of Aspect 1, wherein the PDCCH candidate is not monitored when the at least one SSB is to collide with at least one of the plurality of sets of REGs.

Aspect 4: The method of Aspect 1, wherein the PDCCH candidate is not monitored in a set of REGs of the PDCCH candidate when the at least one SSB is to collide with the set of REGs, regardless of whether a TCI state, associated with the set of REGs, is also associated with the set of SSBs.

Aspect 5: The method of Aspect 1, wherein the PDCCH candidate is monitored in a set of REGs of the PDCCH candidate when the at least one SSB is to collide with the set of REGs, and a TCI state, associated with the set of REGs, is not associated with the set of SSBs.

Aspect 6: The method of Aspect 1, wherein the PDCCH candidate is not monitored in a set of REGs of the PDCCH candidate when the at least one SSB is to collide with the set of REGs, and a TCI state, associated with the set of REGs, is also associated with the set of SSBs.

Aspect 7: The method of any of Aspects 1-6, wherein a first set of REGs of the PDCCH candidate is associated with a first TCI state that is also associated with a first set of SSBs, and a second set of REGs of the PDCCH candidate is associated with a second TCI state that is also associated with a second set of SSBs.

Aspect 8: The method of Aspect 7, wherein the first set of SSBs is associated with a first physical cell identifier (PCI) and the second set of SSBs is associated with a second PCI.

Aspect 9: The method of Aspect 8, wherein receiving the information comprises: receiving first information, associated with the first PCI, indicating resource locations in which SSBs of the first set of SSBs are to be transmitted; and receiving second information, associated with the second PCI, indicating resource locations in which SSBs of the second set of SSBs are to be transmitted.

Aspect 10: The method of Aspect 7, wherein the first set of SSBs and the second set of SSBs are associated with a same physical cell identifier.

Aspect 11: The method of any of Aspects 1-10, wherein selectively monitoring the PDCCH candidate in the one or more of the plurality of sets of REGs is further based at least in part on a radio resource control configuration or a capability of the UE.

Aspect 12: The method of any of Aspects 1-11, wherein the information is received in a system information block or a radio resource control configuration.

Aspect 13: A method of wireless communication performed by a base station, comprising: transmitting, to a user equipment (UE), information indicating resource locations in which one or more synchronization signal blocks (SSBs), of a set of SSBs, are to be transmitted; determining whether the UE is to monitor a physical downlink control channel (PDCCH) candidate in one or more of a plurality of sets of resource element groups (REGs) of the PDCCH candidate based at least in part on whether at least one SSB, of the one or more SSBs, is to collide with the one or more of the plurality of sets of REGs, the plurality of sets of REGs being associated with respective transmission configuration indicator (TCI) states; and selectively transmitting in the one or more of the plurality of sets of REGs of the PDCCH candidate based at least in part on determining whether the UE is to monitor the PDCCH candidate in the one or more of the plurality of sets of REGs.

Aspect 14: The method of Aspect 13, wherein the plurality of sets of REGs includes a first set of REGs and a second set of REGs, and the PDCCH candidate is to be monitored in the first set of REGs and not in the second set of REGs when the at least one SSB is to collide with the second set of REGs and is not to collide with the first set of REGs.

Aspect 15: The method of Aspect 13, wherein the PDCCH candidate is not to be monitored when the at least one SSB is to collide with at least one of the plurality of sets of REGs.

Aspect 16: The method of Aspect 13, wherein the PDCCH candidate is not to be monitored in a set of REGs of the PDCCH candidate when the at least one SSB is to collide with the set of REGs, regardless of whether a TCI state, associated with the set of REGs, is also associated with the set of SSBs.

Aspect 17: The method of Aspect 13, wherein the PDCCH candidate is to be monitored in a set of REGs of the PDCCH candidate when the at least one SSB is to collide with the set of REGs, and a TCI state, associated with the set of REGs, is not associated with the set of SSBs.

Aspect 18: The method of Aspect 13, wherein the PDCCH candidate is not to be monitored in a set of REGs of the PDCCH candidate when the at least one SSB is to collide with the set of REGs, and a TCI state, associated with the set of REGs, is also associated with the set of SSBs.

Aspect 19: The method of any of Aspects 13-18, wherein a first set of REGs of the PDCCH candidate is associated with a first TCI state that is also associated with a first set of SSBs, and a second set of REGs of the PDCCH candidate is associated with a second TCI state that is also associated with a second set of SSBs.

Aspect 20: The method of Aspect 19, wherein the first set of SSBs is associated with a first physical cell identifier (PCI) and the second set of SSBs is associated with a second PCI.

Aspect 21: The method of Aspect 20, wherein transmitting the information comprises: transmitting first information, associated with the first PCI, indicating resource locations in which SSBs of the first set of SSBs are to be transmitted; and transmitting second information, associated with the second PCI, indicating resource locations in which SSBs of the second set of SSBs are to be transmitted.

Aspect 22: The method of Aspect 19, wherein the first set of SSBs and the second set of SSBs are associated with a same physical cell identifier.

Aspect 23: The method of any of Aspects 13-22, wherein determining whether the UE is to monitor the PDCCH candidate in the one or more of the plurality of sets of REGs is further based at least in part on a radio resource control configuration for the UE or a capability of the UE.

Aspect 24: The method of any of Aspects 13-23, wherein the information is transmitted in a system information block or a radio resource control configuration.

Aspect 25: An apparatus for wireless communication at a device, comprising a processor; memory coupled with the processor; and instructions stored in the memory and executable by the processor to cause the apparatus to perform the method of one or more of Aspects 1-12.

Aspect 26: A device for wireless communication, comprising a memory and one or more processors coupled to the memory, the one or more processors configured to perform the method of one or more of Aspects 1-12.

Aspect 27: An apparatus for wireless communication, comprising at least one means for performing the method of one or more of Aspects 1-12.

Aspect 28: A non-transitory computer-readable medium storing code for wireless communication, the code comprising instructions executable by a processor to perform the method of one or more of Aspects 1-12.

Aspect 29: A non-transitory computer-readable medium storing a set of instructions for wireless communication, the set of instructions comprising one or more instructions that, when executed by one or more processors of a device, cause the device to perform the method of one or more of Aspects 1-12.

Aspect 25: An apparatus for wireless communication at a device, comprising a processor; memory coupled with the processor; and instructions stored in the memory and executable by the processor to cause the apparatus to perform the method of one or more of Aspects 13-24.

Aspect 26: A device for wireless communication, comprising a memory and one or more processors coupled to the memory, the one or more processors configured to perform the method of one or more of Aspects 13-24.

Aspect 27: An apparatus for wireless communication, comprising at least one means for performing the method of one or more of Aspects 13-24.

Aspect 28: A non-transitory computer-readable medium storing code for wireless communication, the code comprising instructions executable by a processor to perform the method of one or more of Aspects 13-24.

Aspect 29: A non-transitory computer-readable medium storing a set of instructions for wireless communication, the set of instructions comprising one or more instructions that, when executed by one or more processors of a device, cause the device to perform the method of one or more of Aspects 13-24.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A mobile station for wireless communication, comprising:
   one or more memories; and
   one or more processors, coupled to the one or more memories, configured to:
      receive, from a base station, information indicating resource locations in which one or more synchronization signal blocks (SSBs) are to be transmitted; and
      selectively monitor a plurality of physical downlink control channel (PDCCH) repetitions based at least in part on whether at least one SSB, of the one or more SSBs, is to collide with one or more of the plurality of PDCCH repetitions.

2. The mobile station of claim 1, wherein the plurality of PDCCH repetitions comprises a first set of PDCCH repetitions and a second set of PDCCH repetitions, and the first set of PDCCH repetitions is monitored and the second set of PDCCH repetitions is not monitored when the at least one SSB is to collide with the second set of PDCCH repetitions and is not to collide with the first set of PDCCH repetitions.

3. The mobile station of claim 1, wherein the plurality of PDCCH repetitions are not monitored when the at least one SSB is to collide with at least one of the plurality of PDCCH repetitions.

4. The mobile station of claim 1, wherein a set of PDCCH repetitions, of the plurality of PDCCH repetitions, is not monitored when the at least one SSB is to collide with the set of PDCCH repetitions, regardless of whether a transmission configuration indicator (TCI) state, associated with the set of PDCCH repetitions, is also associated with a set of SSBs.

5. The mobile station of claim 1, wherein a set of PDCCH repetitions, of the plurality of PDCCH repetitions, is monitored when the at least one SSB is to collide with the set of PDCCH repetitions, and a transmission configuration indicator (TCI) state, associated with the set of PDCCH repetitions, is not associated with a set of SSBs.

6. The mobile station of claim 1, wherein a set of PDCCH repetitions, of the plurality of PDCCH repetitions, is not monitored when the at least one SSB is to collide with the set of PDCCH repetitions, and a transmission configuration indicator (TCI) state, associated with the set of PDCCH repetitions, is also associated with a set of SSBs.

7. The mobile station of claim 1, wherein a first set of PDCCH repetitions, of the plurality of PDCCH repetitions, is associated with a first transmission configuration indicator (TCI) state that is also associated with a first set of SSBs, and a second set of PDCCH repetitions, of the plurality of PDCCH repetitions, is associated with a second TCI state that is also associated with a second set of SSBs.

8. The mobile station of claim 7, wherein the first set of SSBs is associated with a first physical cell identifier (PCI) and the second set of SSBs is associated with a second PCI.

9. The mobile station of claim 8, wherein the one or more processors, to transmit the information, are configured to:
   receive first information, associated with the first PCI, indicating resource locations in which SSBs of the first set of SSBs are to be transmitted; and
   receive second information, associated with the second PCI, indicating resource locations in which SSBs of the second set of SSBs are to be transmitted.

10. The mobile station of claim 1, wherein the information indicating the resource locations comprises an indication of time domain locations of the one or more SSBs.

11. The mobile station of claim 1, wherein the one or more processors, to receive the information, are configured to receive the information in a system information block.

12. The mobile station of claim 1, wherein the one or more processors, to receive the information, are configured to receive the information in a serving cell configuration common message.

13. The mobile station of claim 1, wherein the one or more SSBs are of a set of SSBs that comprises a SSB burst.

14. A base station for wireless communication, comprising:
   one or more memories; and
   one or more processors, coupled to the one or more memories, configured to:
      transmit, to a mobile station, information indicating resource locations in which one or more synchronization signal blocks (SSBs) are to be transmitted; and
      selectively transmit in a plurality of physical downlink control channel (PDCCH) repetitions based at least in part on whether at least one SSB, of the one or more SSBs, is to collide with one or more of the plurality of PDCCH repetitions.

15. The base station of claim 14, wherein the plurality of PDCCH repetitions comprises a first set of PDCCH repetitions and a second set of PDCCH repetitions, and the base station is to transmit in the first set of PDCCH repetitions and not in the second set of PDCCH repetitions when the at least one SSB is to collide with the second set of PDCCH repetitions and is not to collide with the first set of PDCCH repetitions.

16. The base station of claim 14, wherein the base station is not to transmit in the plurality of PDCCH repetitions when the at least one SSB is to collide with at least one of the plurality of PDCCH repetitions.

17. The base station of claim 14, wherein the base station is not to transmit in a set of PDCCH repetitions, of the plurality of PDCCH repetitions, when the at least one SSB is to collide with the set of PDCCH repetitions, regardless of whether a transmission configuration indicator (TCI) state, associated with the set of PDCCH repetitions, is also associated with a set of SSBs.

18. The base station of claim 14, wherein the base station is to transmit in a set of PDCCH repetitions, of the plurality of PDCCH repetitions, when the at least one SSB is to collide with the set of PDCCH repetitions, and a transmission configuration indicator (TCI) state, associated with the set of PDCCH repetitions, is not associated with a set of SSBs.

19. The base station of claim 14, wherein a first set of PDCCH repetitions, of the plurality of PDCCH repetitions, is associated with a first transmission configuration indicator (TCI) state that is also associated with a first set of SSBs, and a second set of PDCCH repetitions, of the plurality of PDCCH repetitions, is associated with a second TCI state that is also associated with a second set of SSBs.

20. The base station of claim 19, wherein the first set of SSBs is associated with a first physical cell identifier (PCI) and the second set of SSBs is associated with a second PCI.

21. The base station of claim 20, wherein the one or more processors, to transmit the information, are configured to:
transmit first information, associated with the first PCI, indicating resource locations in which SSBs of the first set of SSBs are to be transmitted; and
transmit second information, associated with the second PCI, indicating resource locations in which SSBs of the second set of SSBs are to be transmitted.

22. The mobile station of claim 14, wherein the information indicating the resource locations comprises an indication of time domain locations of the one or more SSBs of a set of SSBs.

23. The mobile station of claim 14, wherein the one or more processors, to receive the information, are configured to receive the information in a system information block.

24. The mobile station of claim 14, wherein the one or more processors, to receive the information, are configured to receive the information in a serving cell configuration common message.

25. The mobile station of claim 14, wherein the one or more SSBs are of set of SSBs that comprises a SSB burst.

26. A method of wireless communication performed by a mobile station, comprising:
receiving, from a base station, information indicating resource locations in which one or more synchronization signal blocks (SSBs) are to be transmitted; and
selectively monitoring a plurality of physical downlink control channel (PDCCH) repetitions based at least in part on whether at least one SSB, of the one or more SSBs, is to collide with one or more of the plurality of PDCCH repetitions.

27. The method of claim 26, wherein receiving the information comprises receiving the information in a system information block.

28. The mobile station of claim 26, wherein receiving the information comprises receiving the information in a serving cell configuration common message.

29. The mobile station of claim 26, wherein the one or more SSBs are of a set of SSBs that comprises a SSB burst.

30. A method of wireless communication performed by a base station, comprising:
transmitting, to a mobile station, information indicating resource locations in which one or more synchronization signal blocks (SSBs) are to be transmitted; and
selectively transmitting in a plurality of physical downlink control channel (PDCCH) repetitions based at least in part on whether at least one SSB, of the one or more SSBs, is to collide with one or more of the plurality of PDCCH repetitions.

* * * * *